United States Patent [19]
Brereton et al.

[11] Patent Number: 6,128,612
[45] Date of Patent: Oct. 3, 2000

[54] METHOD AND SYSTEM FOR TRANSLATING AN AD-HOC QUERY LANGUAGE USING COMMON TABLE EXPRESSIONS

[75] Inventors: JoAnn Piersa Brereton, Hawthorne; Anna Rosa Coden, Riverdale; Michael Stephen Schwartz, Bronx, all of N.Y.

[73] Assignee: International Business Machines Corporation, Armonk, N.Y.

[21] Appl. No.: 09/106,968

[22] Filed: Jun. 30, 1998

[51] Int. Cl.[7] .................................................. G06F 17/30
[52] U.S. Cl. ..................................................... 707/4; 707/3
[58] Field of Search ..................................... 707/1–3, 4, 5

[56] References Cited

U.S. PATENT DOCUMENTS 5,732,274  3/1998  O'Neill ........................................ 717/5
5,899,997  5/1999  Ellacott ..................................... 707/103
5,991,754  11/1999  Raitto et al. ................................. 707/2

*Primary Examiner*—Paul V. Kulik
*Attorney, Agent, or Firm*—Norman L. Gundel

[57] ABSTRACT

A method and data processing system are disclosed for translating an ad-hoc user input string into Structured Query Language. A user input string is parsed placing joiner objects and left parentheses into a temporary pushdown stack and placing query clause objects into a postfix queue. After encountering a query clause object or a right parenthesis, the next item in the pushdown stack is placed in the postfix queue if it is a joiner object. Once the input string is parsed, objects in the postfix queue are placed into a second temporary pushdown stack and also used to form common table expressions using adjacent items in the second pushdown stack. Finally, an SQL SELECT statement is formed using a JOIN on the ids returned by the common table expressions.

9 Claims, 5 Drawing Sheets

METHOD AND SYSTEM FOR TRANSLATING AN AD-HOC QUERY LANGUAGE USING COMMON TABLE EXPRESSIONS

BACKGROUND OF THE INVENTION

1. Field of the Invention

The present invention relates to relational database query formulation and more particularly to translation of ad-hoc query language to Structured Query Language prior to execution of a query.

2. Description of the Related Art

A relational database often includes tables which contain records that have a zero-to-many relationship to records in other tables. For example, a table of movie titles may be related to a second table which contains a list of actors, and to a third table which contains a list of writers. The actor and writer tables contain a foreign key referencing back to the titles of movies. In this way, each record in the actors or writers table represents an actor's or writer's participation in a particular movie. The same actor may appear zero to many times representing each movie he/she performed in. Likewise, the movie "key" may appear in multiple records since, naturally, many actors appear in any one movie. For simplicity, the title table may be referred to as a "parent" table and the actor and writer tables as "child" tables.

The challenge is to formulate a valid SQL query that can return items from the parent table based on an ad-hoc query from a user interface. The allowable fields for the user can be from either the parent or any of its child fields. For example, the user may choose to query for movies in which two distinct actors appeared together.

Some database query systems, like the "Find" Assistant of Lotus Approach 97 (trademarks of Lotus Development Corporation) when used with DBASE (DBF) files, choose not to allow this condition, forcing the user to enter only one name per field chosen. Pre SQL-3 compliant systems might provide the user with a means to enter the query in some ad-hoc language (e.g. actor="CHER" or actor="OLYMPIA DUKAKIS") and then actually submit two or more separate database queries to the underlying database and manage the results list in the middleware between the GUI and database. This can lead to poor performance since each subsequent query returns a full result list for the particular query clause. Other database query systems provide the user with direct access to SQL, allowing them to create more complicated looking, but effective queries, such as:

with actor1(id) as (select title_id from title where actor= "CHER"), actor2(id) as (select title_id from title where actor="OLYMPIA DUKAKIS")
SELECT distinct titleid, title from title, actor1, actor2 where title.titleid=actor1.id and
  title.titleid=actor2.id A less verbose but flexible database query system is needed that provides a simpler ad-hoc query interface that directly maps to a single DB2 SQL query, thereby permitting complex queries in a simple user interface without the overhead of additional result list management code. Preferably, such a system places the burden of optimizing the query on the database, which is better equipped to do the job.

SUMMARY OF THE INVENTION

In accordance with the present invention, a method and data processing system are disclosed for translating an ad-hoc user input string into Structured Query Language. A user input string is parsed placing joiner objects and left parentheses into a temporary pushdown stack and placing query clause objects into a postfix queue. After encountering a query clause object or a right parenthesis, the next item in the pushdown stack is placed in the postfix queue if it is a joiner object. Once the input string is parsed, objects in the postfix queue are placed into a second temporary pushdown stack and also used to form common table expressions using adjacent items in the second pushdown stack. Finally, an SQL SELECT statement is formed using a JOIN on the ids returned by the common table expressions.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment and when read in conjunction with the accompanying drawings, wherein:

While the invention will be described in connection with a preferred embodiment and process, the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE INVENTION

Figure 1:
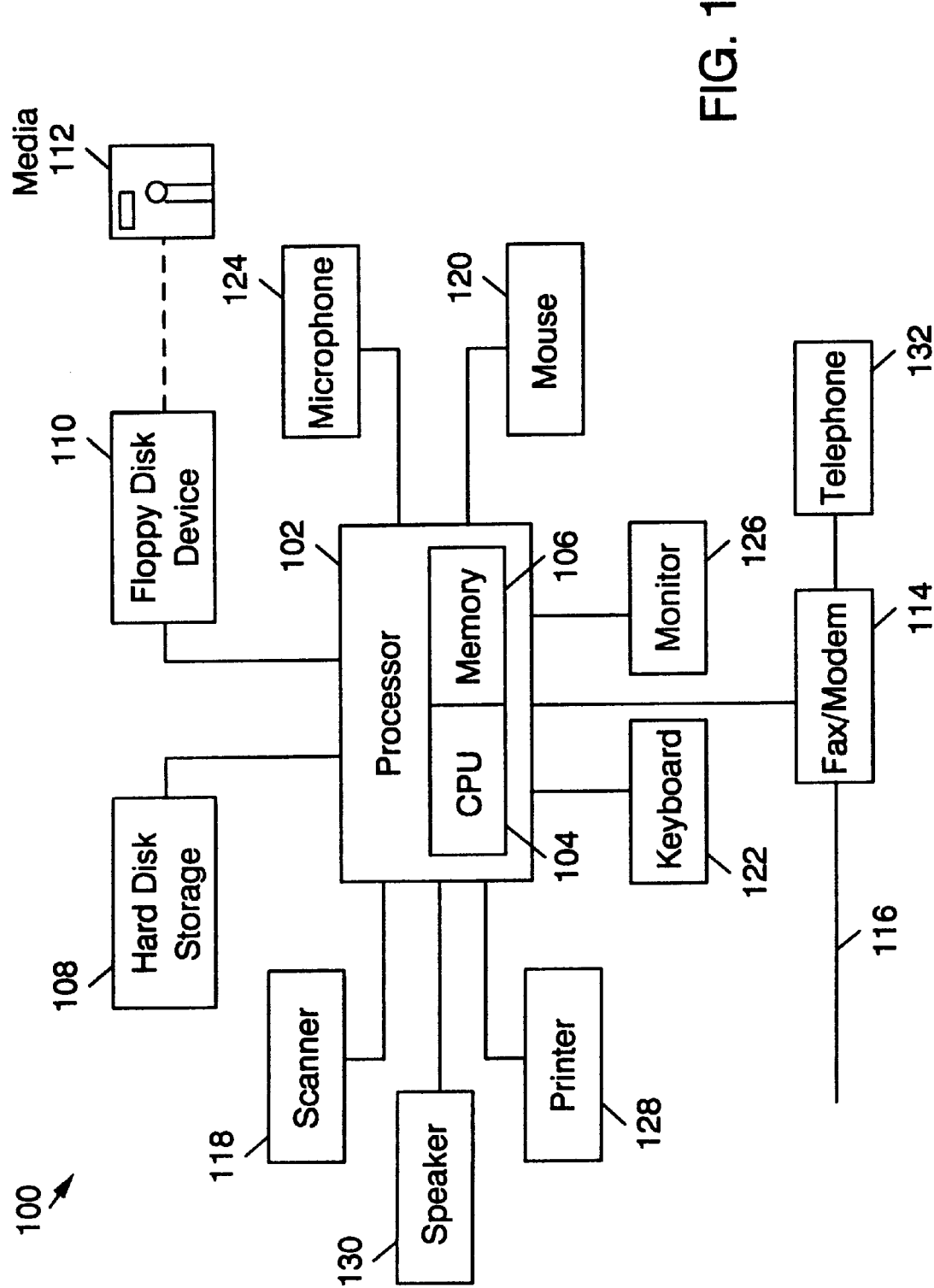
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, a data processing system 100 which may be used to implement the method and apparatus of the present invention. The data processing system 100 may preferably be an IBM PC computer (trademark of IBM Corp.) running the Microsoft Windows NT 4.0 operating system (trademark of Microsoft Corp.) and IBM Database 2 Single User Edition for Windows NT, version 2.1.2 or higher (trademark of IBM Corp.). The data processing system 100 includes a processor 102, which includes a central processing unit (CPU) 104 and memory 106. Additional memory, such as a hard disk file storage 108 and a removable media device 110 having removable media 112 may be connected to the processor 102. Removable media device 110 may read from and, usually, write to removable media 112. Removable media 112 may be magnetic or optical, such as a floppy diskette or a magnetic tape or a compact disk—read only (CD-ROM), write once (CD-R) or rewritable (CD-RW) memory. Memory 106, 108 or 112 may have computer program code recorded therein that implements portions of the present invention in the data processing system 100. Inputs may also be received from a fax/modem 114 or network interface card, which is connected to a telephone line 116 or a local area or wide area network. The data processing system 100 also includes user interface hardware, such as a pointing device such as mouse 120, a keyboard 122, an optical scanner 118 and a microphone 124, for allowing user input to the processor 102. The data processing system 100 also includes visual display devices, such as a monochrome or color display monitor 126 and a monochrome or color display printer 128, for rendering visual information. The data processing system may also include an audio display device, such as a speaker 130 for rendering audio information. A telephone 132 may also be connected to the telephone line 116.

Figure 2:
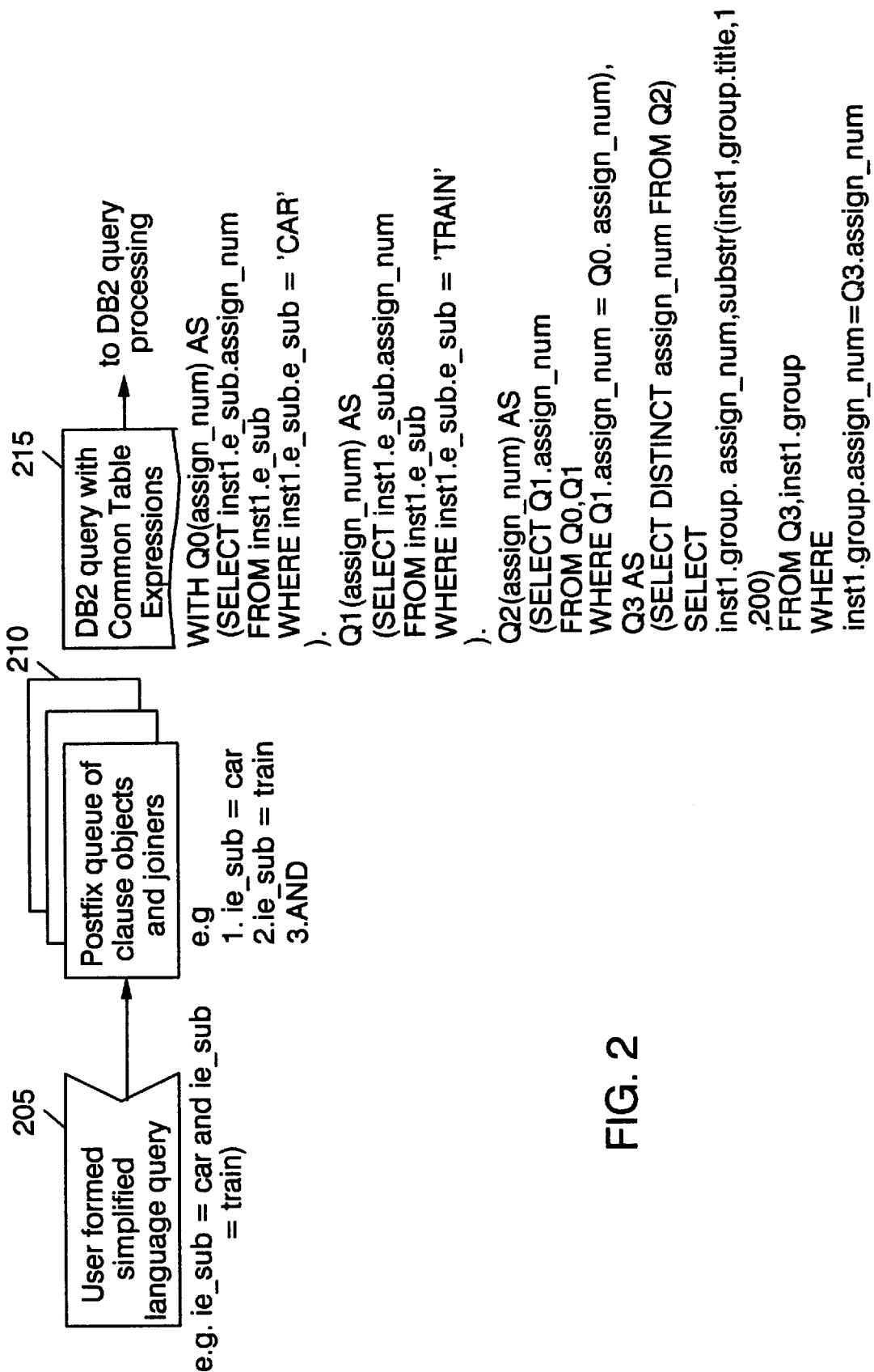
FIG. 2 is a high level logic flowchart illustrating an overview of the method of the present invention for translating an ad-hoc query to structured query language.

Referring now to FIG. 2, there is depicted a high level logic flowchart illustrating the operations preferred in carrying out the method of the present invention for translating an ad-hoc query to structured query language using common table expressions. The process begins at block 205, in which a user formed input simplified language query is received. When the search is initiated by the user, as by clicking on a "Search button, the process proceeds to block 210 and processes the input query to create a postfix queue of clause objects and joiners. The process processes the queue to create a DB2 query using common table expressions, as shown at block 215. This processing is described in greater detail below.

Figure 3:
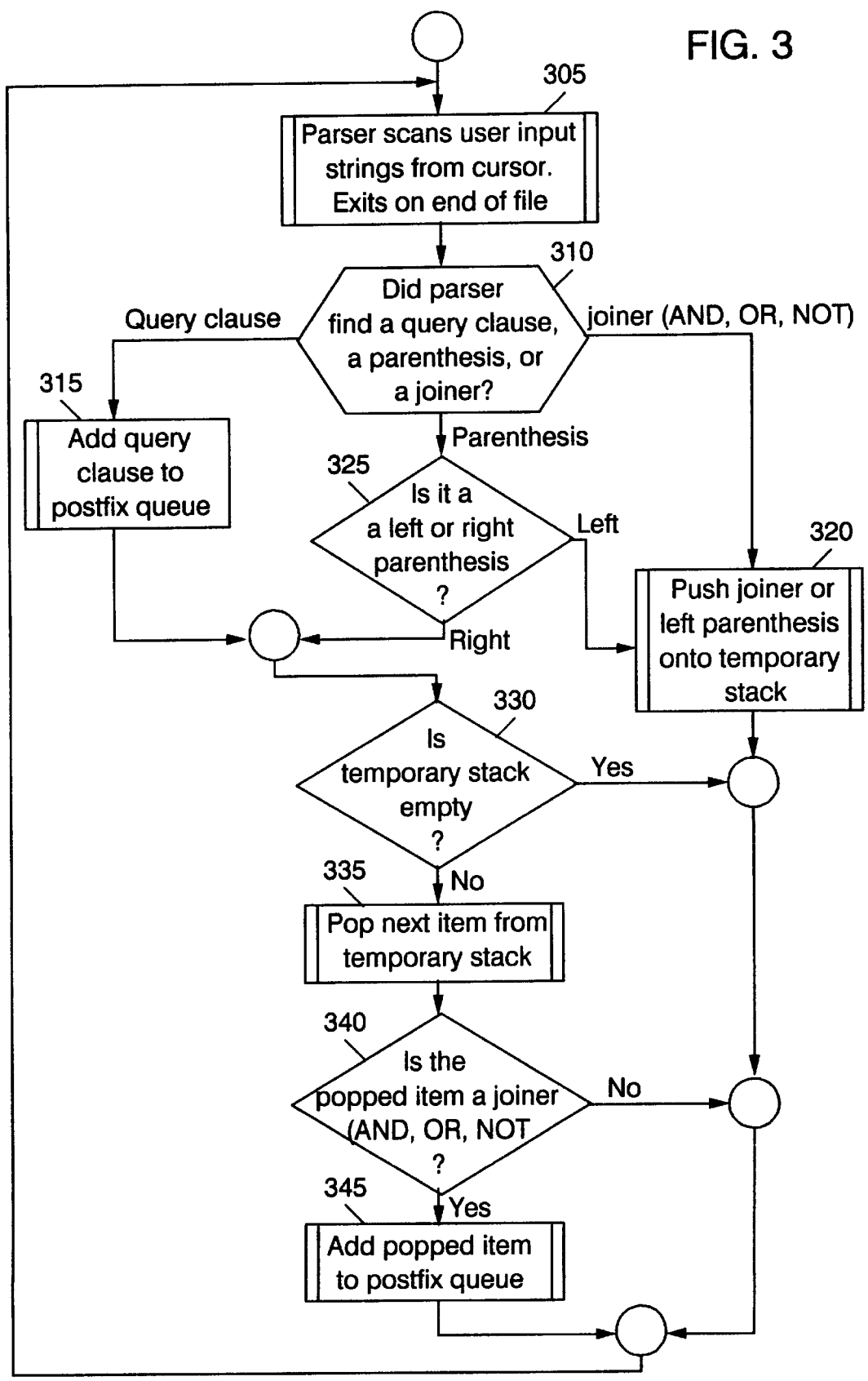
FIG. 3 is a high level logic flowchart illustrating the process of creating a postfix queue from a user input string.

Turning next to FIG. 3, the process of creating the postfix queue is illustrated. The process commences at block 305 where a parser scans objects contained in a user input string received from the cursor. The objects are scanned from left to right. If the parser finds a parenthesis, a query clause object or a joiner object, the process proceeds from block 305 to block 310. Otherwise, the process of creating the postfix queue terminates at block 305.

A query clause object includes three components: (1) a field key string that maps into a system-defined hashtable to return field mappings within the connected database, (2) a comparator, such as =, <, <=, >, >=, !=, "LIKE", "SOUNDSLIKE", ":", "STARTSWITH", "?", "BETWEEN", "ANY", and "ALL", and (3) one or more comparands in string form. Examples of query clause objects are:
/name=Clinton,Bill date>1998-01-01 /name soundslike ghaddafi
A query joiner object is any of the terms "AND", "OR", and "NOT".

Returning to FIG. 3, at block 310, the process determines which of a query clause object, a joiner object or a parenthesis is found. The process will maintain a temporary postfix FIFO queue and a temporary pushdown LIFO stack in memory. Both are initially empty. If a query clause is found at block 310, the process proceeds to block 315 and adds the query clause to the postfix FIFO queue. The process then proceeds to block 330.

If a joiner is found at block 310, the process proceeds to block 320 and adds the joiner to the temporary pushdown stack. The process then returns to block 305 and scans the next object in the input string, as described above.

If a parenthesis is found at block 310, the process proceeds to block 325, where the process determines whether the parenthesis is a left parenthesis or a right parenthesis. If a left parenthesis, the process proceeds to block 320 and adds the left parenthesis to the temporary pushdown stack. The process then returns to block 305 and scans the next object in the input string, as described above.

If the parenthesis is a right parenthesis, the process proceeds to block 330 without modifying either the temporary postfix FIFO queue or the temporary pushdown stack.

At block 330, the process determines whether the temporary pushdown stack is empty. If empty, the process returns to block 305 and scans the next object in the input string, as described above. If the temporary pushdown stack is not empty, however, the process proceeds from block 330 to block 335 and pops up the next item in the temporary pushdown stack for consideration. This is the item most recently added to the temporary pushdown stack. The process then proceeds to block 340 and determines whether the popped item is a joiner object. If it is a joiner object, the process proceeds to block 345, adds the popped item to the postfix queue, and then returns to block 305. If the popped item is not a joiner object, the process returns from block 340 to block 305. At block 305, the process scans the next object in the input string, as described above. When the temporary stack is empty and there are no more items in the input queue, the postfix queue is complete and the process of creating the postfix queue terminates.

Figure 4A:
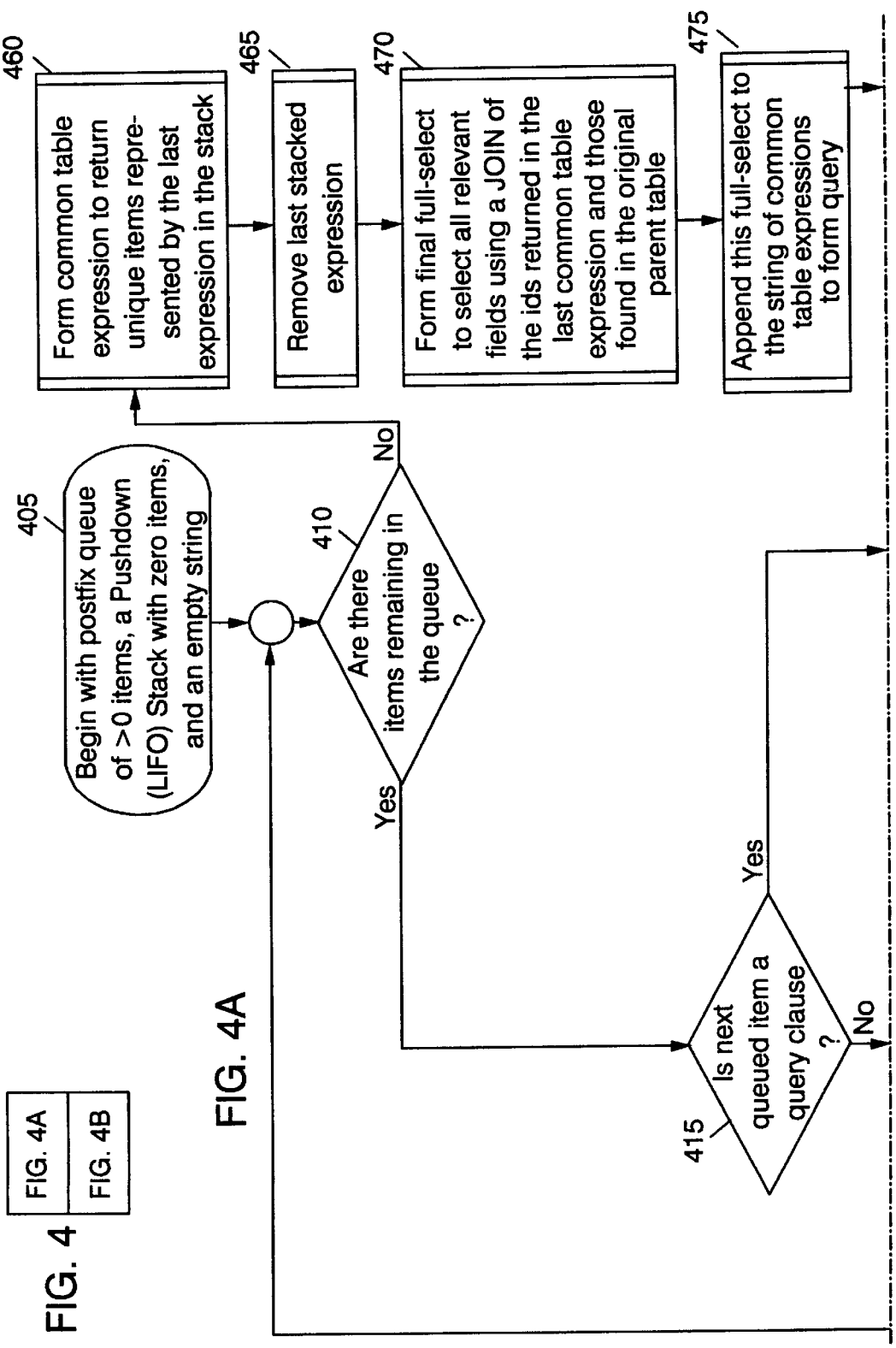
FIG. 4 is a high level logic flowchart illustrating the process of creating the query from the postfix queue created by the process of FIG. 3.
Figure 4B:
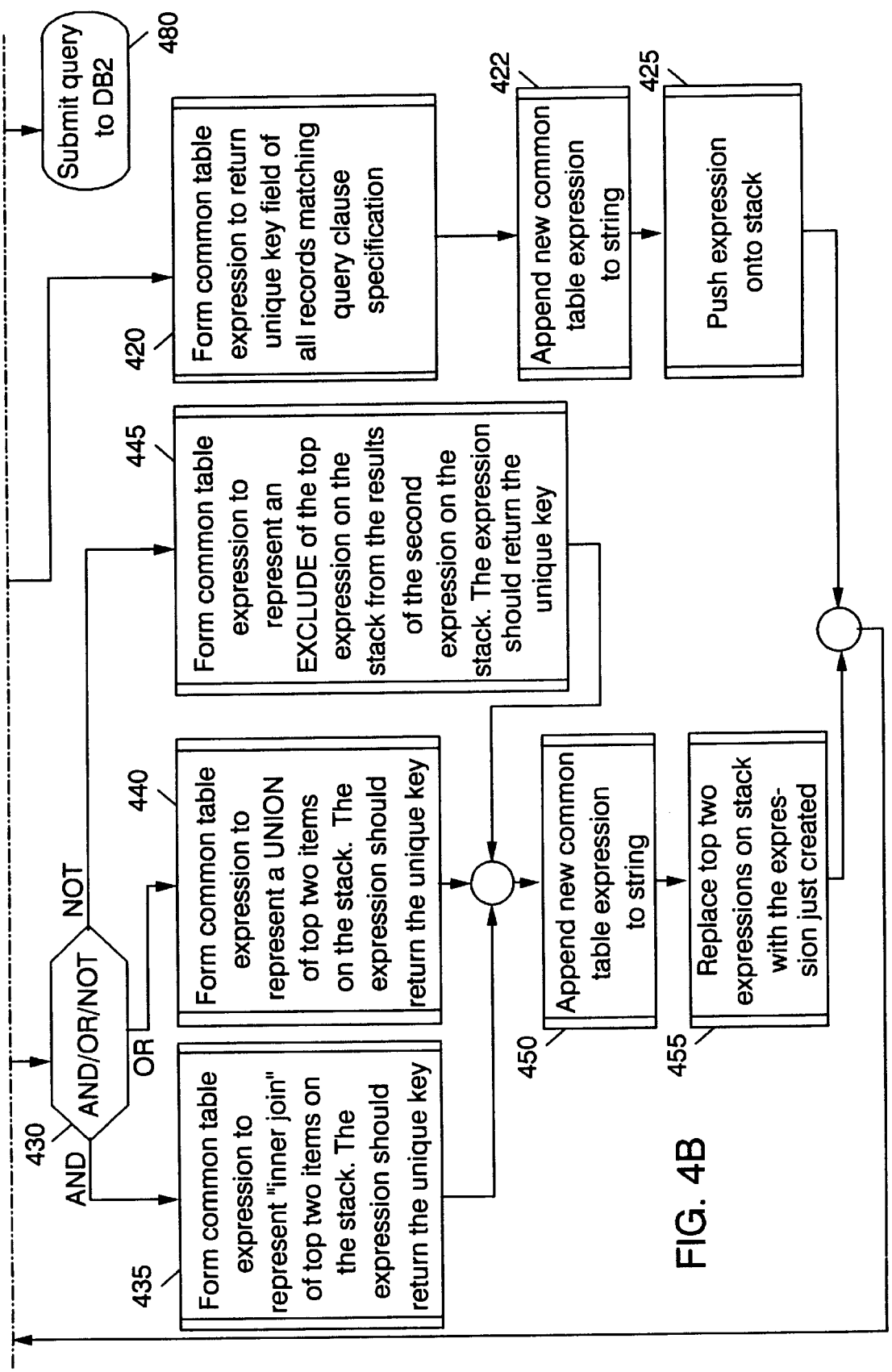

Turning next to FIG. 4, there is shown the process of using the postfix queue to translate the user input string into a string of common table expressions. The process uses the postfix queue created by the process described in FIG. 3, a temporary pushdown LIFO stack initially containing zero items and an initially empty string. The process begins at block 405 and proceeds to block 410 and determines whether any unprocessed objects remain in the postfix queue created by the process of FIG. 3. If so, the process proceeds from block 410 to block 415 and determines whether the next object in the postfix queue is a query clause object.

If the next object in the postfix queue is a query clause object, the process proceeds from block 415 to block 420 and forms a common table expression to return the unique key field of all records matching the query clause specification. The process then proceeds to block 422 and appends the common table expression just created in block 420 to the initially empty string. The process then proceeds to block 425 and pushes the common table expression into the pushdown stack. The process then returns to block 410 to determine whether any unprocessed objects remain in the postfix queue as described above.

Returning to block 415, if the process determines that the next object in the postfix queue is not a query clause object, the process proceeds to block 430 and determines whether the object is an "AND" joiner object, an "OR" joiner object, or a "NOT" joiner object.

If the next object is an "AND" joiner object, the process proceeds from block 430 to block 435 and forms a common table expression to represent an "inner join" of the top two items in the pushdown stack. This common table expression should return the unique key. The process then proceeds to block 450, described below.

If the next object is an "OR" joiner object, the process proceeds from block 430 to block 440 and forms a common table expression to represent a "union" of the top two items in the pushdown stack. This common table expression should return the unique key. The process then proceeds to block 450, described below.

Finally, if the next object is a "NOT" joiner object, the process proceeds from block 430 to block 445 and forms a common table expression to represent an "exclude" of the top item in the pushdown stack from the results of the second item of the pushdown stack. This common table expression should return the unique key. The process then proceeds to block 450, described below.

At block 450, the process appends the common table expression just created in block 435, 440 or 445 to the initially empty string. The process then proceeds to block 455 and replaces the top two expressions of the pushdown stack with the expression just created in block 435, 440 or 445. The process then returns to block 410 to determine whether any unprocessed objects remain in the postfix queue as described above.

Returning to block 410, if the process determines that no unprocessed items remain in the postfix queue, the process proceeds from block 410 to block 460 and forms a common table expression to return items represented by the last expression in the pushdown stack. The process then proceeds to block 465 and removes the last expression from the input stack. The process then proceeds to block 470 and forms a final full-SELECT statement to select all relevant fields using a JOIN of the ids returned in the last common table expression and those ids found in the original parent table. The process then proceeds to block 475 and appends this final full-SELECT to the string of common table expressions in the initially empty string to form an SQL query. The process then proceeds to block 480 and terminates after submitting the query so formed to DB2.

EXAMPLES

The invention is illustrated by the following examples. For these examples, the program knows the following information:
1. There exist tables:
   inst1.group which contains an assign_num field and a title field.
   inst1.e_sub which contains an assign_num field (foreign key relating back to inst1.group) and e_sub field containing some keyword. Note that this may be a zero to many mapping, that is, there may exist zero to many records containing any single assign_num.
   inst1.name which contains an assign_num field (foreign key relating back to inst1.group) and name field containing some keyword. Note that this may be a zero to many mapping, that is, there may exist zero to many records containing any single assign_num.
2. There exists a hashtable that knows to map the user keyword "/e_sub" to the database field named inst1.e_sub.e_sub and "/name" to inst1.name.name.

Example 1.

In Example 1, a user is attempting to find all assignment groups which have an editorial subject (e_sub) of "car". Given a user query:
/e_sub=car
This query consists of one "query clause object". The clause is placed into a postfix queue by the parser.
Postfix queue is . . . 1. /e_sub=car
The translator looks up the keyword "e_sub" in a hashtable and finds that this keyword refers to field inst1.e_sub.e_sub
Thus, the following common table expression is generated.
WITH Q0(assign_num) AS (SELECT inst1.e_sub.assign_num FROM inst1.e_sub WHERE inst1.e_sub.e_sub= 'CAR'),
and the "Q0" common table expression is placed in the stack. The stack is now:
Top—>Q0—>Bottom
Since there are no additional clauses or "joiners" (AND, OR, NOT) in the queue, a final SELECT, based on the previously generated common table expression is appended after obtaining the last common table expression from the stack (Q0):
Q1(assign_num) as (select assign_num from Q0) SELECT inst1.group.assign_num,substr(inst1.group.title,1,200) FROM Q1,inst1.group WHERE inst1.group.assign_num=Q1.assign_num
So, the entire generated SQL is:
WITH Q0(assign_num) AS (SELECT inst1.e_sub.assign_num FROM inst1.e_sub WHERE inst1.e_sub.e_sub= 'CAR'),
Q1(assign_num) as (select assign_num from Q0) SELECT inst1.group.assign_num,substr(inst1.group.title,1,200) FROM Q1,inst1.group WHERE inst1.group.assign_num=Q1.assign_num

Example 2

An "AND" expression

The user is attempting to find all assignment groups which have an editorial subject (e_sub) of BOTH "car" and "train" listed. The next user query might "refine" the first:
/e_sub=car and /e_sub=train
This user query consists of two query clauses and the joiner word "AND".
The parser first finds "/e_sub=car" and recognizes it as a query clause. It is added immediately to the postfix queue. Since the temporary stack is empty, the parser reads the next token and finds the joiner word "AND" which it pushes onto the temporary stack, producing:
Postfix Queue: 1. /e_sub=car
Temporary Stack: 1. AND
Next, the parser finds "/e_sub=train" which it recognizes as a query clause and adds to the postfix queue, producing:
Postfix Queue: 1. /e_sub=car 2. /e_sub=train
Temporary Stack: 1. AND
Since the stack is NOT empty, the "AND" is popped off the stack and is added to the postfix queue.
The final postfix queue passed to the query creation process is:1. "/e_sub=car" 2. "/e_sub=train" 3. AND
The translator traverses the queue. It first generates the subquery for the first query clause:
WITH Q0(assign_num) AS (SELECT inst1.e_sub.assign_num FROM inst1.e_sub WHERE inst1.e_sub.e_sub= 'CAR'),
and places "Q0" on the pushdown stack, which now looks like:
Top—>Q0—>Bottom
It then appends
Q1(assign_num) AS (SELECT inst1.e_sub.assign_num FROM inst1.e_sub WHERE inst1.e_sub.e_sub= 'TRAIN'),
to represent the second query clause and places "Q1" on the stack. The stack is now:
Top —>Q1 —>Q1 —>Bottom
For the third item, the joiner word "AND", an inner join of the previous two subqueries is generated. It uses the two stacked common table expressions (Q1 and Q0) to generate this.
Q2(assign_num) AS (SELECT Q1.assign_num FROM Q0,Q1 WHERE Q1.assign_num=Q0.assign_num),
replaces the two items in the stack with "Q2". Now the stack is:
Top—>Q2—>Bottom
Finally, the last portion appended assures return of the records needed. The "Q2" is obtained from the pushdown stack.

Q3 AS (SELECT DISTINCT assign_num FROM Q2) SELECT
inst1.group.assign_num,substr(inst1.group.title,1,200) FROM Q3,inst1.group WHERE inst1.group.assign_num=Q3.assign_num
So, the final query is:
WITH Q0(assign_num) AS (SELECT inst1.e_sub.assign_num FROM inst1.e_sub WHERE inst1.e_sub.e_sub='CAR'),
Q1(assign_num) AS (SELECT inst1.e_sub.assign_num FROM inst1.e_sub WHERE inst1.e_sub.e_sub='TRAIN'),
Q2(assign_num) AS (SELECT Q1.assign_num FROM Q0,Q1 WHERE Q1.assign_num=Q0.assign_num), Q3 AS (SELECT DISTINCT assign_num FROM Q2) SELECT
inst1.group.assign_num,substr(inst1.group.title,1,200) FROM Q3,inst1.group WHERE inst1.group.assign_num=Q3.assign_num Example 3

Parentheses

The user is attempting to find all assignment groups which list "Cher" as a name and have either "car" or "train" or both "car" and "train" listed as editorial subjects.
/name=cher and (/e_sub=car or /e_sub=train)
Use the rules outlined in FIG. 3 to process the user query as follows. Each line of the table represents a single pass through FIG. 3, Box 305. The arrows represent ordering of the queue or stack.

| Parser Reads . . . | Postfix Queue | Pushes to Temporary Stack |
| --- | --- | --- |
| /name = cher | /name = cher | — |
| AND | /name = cher | AND |
| ( | /name = cher | ( -> AND |
| /e_sub = car | /name = cher -> /e_sub = car | AND |
| OR | /name = cher-> /e_sub = car | OR->AND |
| /e_sub = train | /name = cher-> /e_sub = car-> /e_sub = train-> OR | AND |
| ) | /name = cher-> /e_sub = car-> /e_sub = train-> OR-> AND | — |

The postfix queue that gets passed to the SQL query creation process is:
1. /name=cher
2. /e_sub=car
3. /e_sub=train
4. OR
5. AND
Translating the first three items (all query clauses) in quick succession generates the following SQL:
WITH Q0(assign_num) AS (SELECT inst1.name.assign_num FROM inst1.name WHERE inst1.name.name='CHER'),
Q1(assign_num) AS (SELECT inst1.e_sub.assign_num FROM inst1.e_sub WHERE inst1.e_sub.e_sub='CAR'),
Q2(assign_num) AS (SELECT inst1.e_sub.assign_num FROM inst1.e_sub WHERE inst1.e_sub.e_sub='TRAIN'), . . . and the following pushdown stack:
Top—>Q2—>Q1—>Q0—>Bottom
The fourth item is an "OR". Applying a UNION to the top two common table expressions on the stack results in:
Q3(assign_num) AS
(SELECT Q2.assign_num FROM Q2 UNION
SELECT assign_num FROM Q1),
Replacing these two stacked common table expressions with "Q3":
Top—>Q3—>Q0—>Bottom
The fifth item in the postfix queue is the "AND". Building the following common table expression as a join using the two stacked common table expressions:
Q4(assign_num) AS (SELECT Q3.assign_num FROM Q0,Q3 WHERE Q3.assign_num=Q0.assign_num),
and replacing the two stacked common table expressions with "Q4". The stack is now:
Top—>Q4—>Bottom.
Finally, having exhausted the postfix queue, conclude with the following, having taken "Q4" from the stack:
Q5 AS (SELECT DISTINCT assign_num FROM Q4) SELECT
inst1.group.assign_num,substr(inst1.group.title,1,200) FROM Q5,inst1.group WHERE inst1.group.assign_num=Q5.assign_num
So, the entire query submitted to SQL is:
WITH Q0(assign_num) AS (SELECT inst1.name.assign_num FROM inst1.name WHERE inst1.name.name='CHER'),
Q1(assign_num) AS (SELECT inst1.e_sub.assign_num FROM inst1.e_sub WHERE inst1.esub.e_sub='CAR'),
Q2(assign_num) AS (SELECT inst1.e_sub.assign_num FROM inst1.e_sub WHERE inst1.e_sub.e_sub='TRAIN'),
Q3(assign_num) AS (SELECT Q2.assign_num FROM Q2 UNION
SELECT assign_num FROM Q1),
Q4(assign_num) AS (SELECT Q3.assign_num FROM Q0,Q3 WHERE Q3.assign_num=Q0.assign_num), Q5 AS (SELECT DISTINCT assign_num FROM Q4) SELECT
inst1.group.assign_num,substr(inst1.group.title,1,200) FROM Q5,inst1.group WHERE inst1.group.assign_num=Q5.assign_num
While the invention has been particularly shown and described with reference to a preferred embodiment and process, it will be understood that various changes in form and detail may be made therein without departing from the spirit and scope of the invention.
What is claimed is:
1. A method, performed in a data processing system, for translating an an-hoc query input string to a string of common table expressions, the method comprising the computer implemented steps of:
creating a postfix queue by parsing each item of the input string until all items are parsed:
if the item is a joiner object or left parenthesis, adding the joiner object or left parenthesis to a temporary pushdown stack and then returning to parse the next item of the input string;
if the item is a query clause, adding the query clause to the postfix queue, and
if the object is a query clause or right parenthesis,
if the temporary pushdown stack is empty, returning to parse the next item of the input string;
if the temporary pushdown stack is not empty and the next item in the temporary pushdown stack is not a joiner object, returning to parse the next item of the input string; and if the temporary pushdown stack is not empty and the next item in the temporary pushdown stack is a joiner object, adding the next item in the pushdown stack to the postfix queue and returning to parse the next item of the input string; and processing each item of the postfix queue to translate the input string to an initially empty string of common table expressions until all items are processed:

if the item is a query clause, forming a common table expression to return a unique key field of all records matching the specification of the query clause, placing that expression into a second temporary pushdown stack, appending the new common table expression to the initially empty string, and returning to process the next item of the postfix queue; and if the item is not a query clause:

if the item is an "AND" joiner object, forming a common table expression to represent an "INNER JOIN" of the top two items of the second temporary pushdown stack, said expression returning a unique key field, replacing the top two items of the second temporary pushdown stack with the expression just created, appending the new common table expression to the initially empty string, and returning to process the next item of the postfix queue;

if the item is an "OR" joiner object, forming a common table expression to represent a "UNION" of the top two items of the second temporary pushdown stack, said expression returning a unique key field, replacing the top two items of the second temporary pushdown stack with the expression just created, appending the new common table expression to the initially empty string, and returning to process the next item of the postfix queue; and if the item is a "NOT" joiner object, forming a common table expression to represent an "EXCLUDE" of the top item of the second temporary pushdown stack from the results of the second item of the second temporary pushdown stack, said expression returning a unique key field, replacing the top two items of the second temporary pushdown stack with the expression just created, appending the new common table expression to the initially empty string, and returning to process the next item of the postfix queue.

2. The method of claim 1, further comprising the computer implemented steps, if all items in the postfix queue have been processed, of forming a common table expression to return items represented by the last expression in the second temporary pushdown stack;

removing the last expression from the second temporary pushdown stack; and forming a final SELECT statement.

3. The method of claim 2, wherein the computer implemented step of forming a final SELECT statement includes forming a SELECT statement to select all relevant fields using a "JOIN" of ids resulting from the last common table expression and ids found in an original parent table of a relational database.

4. A data processing system, for translating an an-hoc query input string to a string of common table expressions, comprising:

means for creating a postfix queue by parsing each item of the input string until all items are parsed:

means, if the item is a joiner object or left parenthesis, for adding the joiner object or left parenthesis to a temporary pushdown stack and then returning to parse the next item of the input string;

means, if the item is a query clause, for adding the query clause to the postfix queue, and means, if the object is a query clause or right parenthesis and if the temporary pushdown stack is empty, for returning to parse the next item of the input string;

if the temporary pushdown stack is not empty and the next item in the temporary pushdown stack is not a joiner object, for returning to parse the next item of the input string; and if the temporary pushdown stack is not empty and the next item in the temporary pushdown stack is a joiner object, for adding the next item in the pushdown stack to the postfix queue and returning to parse the next item of the input string; and means for processing each item of the postfix queue to translate the input string to an initially empty string of common table expressions until all items are processed:

means, if the item is a query clause, for forming a common table expression to return a unique key field of all records matching the specification of the query clause, placing that expression into a second temporary pushdown stack, appending the new common table expression to the initially empty string, and returning to process the next item of the postfix queue; and means, if the item is not a query clause and if the item is an "AND" joiner object, for forming a common table expression to represent an "INNER JOIN" of the top two items of the second temporary pushdown stack, said expression returning a unique key field, replacing the top two items of the second temporary pushdown stack with the expression just created, appending the new common table expression to the initially empty string, and returning to process the next item of the postfix queue;

if the item is an "OR" joiner object, for forming a common table expression to represent a "UNION" of the top two items of the second temporary pushdown stack, said expression returning a unique key field, replacing the top two items of the second temporary pushdown stack with the expression just created, appending the new common table expression to the initially empty string, and returning to process the next item of the postfix queue; and if the item is a "NOT" joiner object, for forming a common table expression to represent an "EXCLUDE" of the top item of the second temporary pushdown stack from the results of the second item of the second temporary pushdown stack, said expression returning a unique key field, replacing the top two items of the second temporary pushdown stack with the expression just created, appending the new common table expression to the initially empty string, and returning to process the next item of the postfix queue.

5. The data processing system of claim 4, further comprising means, if all items in the postfix queue have been processed, for forming a common table expression to return items represented by the last expression in the second temporary pushdown stack; for removing the last expression from the second temporary pushdown stack; and for forming a final SELECT statement.

6. The data processing system of claim 5, wherein the means for forming a final SELECT statement includes means for forming a SELECT statement to select all relevant fields using a "JOIN" of ids resulting from the last common table expression and ids found in an original parent table of a relational database.

7. A computer program product, for use in a data processing system, the computer program product comprising:
   a computer usable medium having computer readable program code embodied in said medium for translating an ad-hoc query input string to a string of common table expressions, said computer program including:
      computer readable program code means for creating a postfix queue by parsing each item of the input string until all items are parsed:
         computer readable program code means, if the item is a joiner object or left parenthesis, for adding the joiner object or left parenthesis to a temporary pushdown stack and then returning to parse the next item of the input string;
         computer readable program code means, if the item is a query clause, for adding the query clause to the postfix queue, and
         computer readable program code means, if the object is a query clause or right parenthesis and
            if the temporary pushdown stack is empty, for returning to parse the next item of the input string;
            if the temporary pushdown stack is not empty and the next item in the temporary pushdown stack is not a joiner object, for returning to parse the next item of the input string; and
            if the temporary pushdown stack is not empty and the next item in the temporary pushdown stack is a joiner object, for adding the next item in the pushdown stack to the postfix queue and returning to parse the next item of the input string; and
      computer readable program code means for processing each item of the postfix queue to translate the input string to an initially empty string of common table expressions until all items are processed:
         computer readable program code means, if the item is a query clause, for forming a common table expression to return a unique key field of all records matching the specification of the query clause, placing that expression into a second temporary pushdown stack, appending the new common table expression to the initially empty string, and returning to process the next item of the postfix queue; and
      computer readable program code means, if the item is not a query clause and
         if the item is an "AND" joiner object, for forming a common table expression to represent an "INNER JOIN" of the top two items of the second temporary pushdown stack, said expression returning a unique key field, replacing the top two items of the second temporary pushdown stack with the expression just created, appending the new common table expression to the initially empty string, and returning to process the next item of the postfix queue;
         if the item is an "OR" joiner object, for forming a common table expression to represent a "UNION" of the top two items of the second temporary pushdown stack, said expression returning a unique key field, replacing the top two items of the second temporary pushdown stack with the expression just created, appending the new common table expression to the initially empty string, and returning to process the next item of the postfix queue; and
         if the item is a "NOT" joiner object, for forming a common table expression to represent an "EXCLUDE" of the top item of the second temporary pushdown stack from the results of the second item of the second temporary pushdown stack, said expression returning a unique key field, replacing the top two items of the second temporary pushdown stack with the expression just created, appending the new common table expression to the initially empty string, and returning to process the next item of the postfix queue.

8. The computer program product of claim 7, further comprising computer readable program code means, if all items in the postfix queue have been processed, for forming a common table expression to return items represented by the last expression in the second temporary pushdown stack; for removing the last expression from the second temporary pushdown stack; and for forming a final SELECT statement.

9. The computer program product of claim 8, wherein the computer readable program code means for forming a final SELECT statement includes means for forming a SELECT statement to select all relevant fields using a "JOIN" of ids resulting from the last common table expression and ids found in an original parent table of a relational database.

\* \* \* \* \*